(12) United States Patent
Pierce

(10) Patent No.: US 8,606,927 B2
(45) Date of Patent: Dec. 10, 2013

(54) MULTI-DEVICE COMMUNICATION METHOD AND SYSTEM

(75) Inventor: Jeffrey Scott Pierce, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 12/050,986

(22) Filed: Mar. 19, 2008

(65) Prior Publication Data

US 2008/0177885 A1   Jul. 24, 2008

Related U.S. Application Data

(63) Continuation of application No. 11/625,358, filed on Jan. 22, 2007, now abandoned.

(51) Int. Cl.
*G06F 15/16* (2006.01)

(52) U.S. Cl.
USPC .......................................................... 709/227

(58) Field of Classification Search
USPC ......... 709/203–207, 213–216, 220, 222, 227, 709/248
See application file for complete search history.

(56) References Cited

U.S. PATENT DOCUMENTS

| | | | | |
|---|---|---|---|---|
| 6,073,188 | A * | 6/2000 | Fleming | 710/38 |
| 6,738,808 | B1 * | 5/2004 | Zellner et al. | 709/223 |
| 6,954,641 | B2 * | 10/2005 | McKenna et al. | 455/435.1 |
| 6,970,547 | B2 * | 11/2005 | Andrews et al. | 379/210.01 |
| 7,213,047 | B2 * | 5/2007 | Yeager et al. | 709/202 |
| 7,254,608 | B2 * | 8/2007 | Yeager et al. | 709/203 |
| 7,277,719 | B2 * | 10/2007 | Klassen et al. | 455/466 |
| 7,328,243 | B2 * | 2/2008 | Yeager et al. | 709/205 |
| 7,730,482 | B2 * | 6/2010 | Illowsky et al. | 717/177 |
| 7,761,863 | B2 * | 7/2010 | Illowsky et al. | 717/167 |
| 7,788,663 | B2 * | 8/2010 | Illowsky et al. | 717/177 |
| 7,917,628 | B2 * | 3/2011 | Hesselink et al. | 709/227 |
| 8,037,202 | B2 * | 10/2011 | Yeager et al. | 709/238 |
| 8,108,455 | B2 * | 1/2012 | Yeager et al. | 709/202 |
| 2002/0010742 | A1 * | 1/2002 | Kihara et al. | 709/204 |
| 2002/0059405 | A1 * | 5/2002 | Angwin et al. | 709/223 |
| 2002/0188854 | A1 * | 12/2002 | Heaven et al. | 713/186 |
| 2004/0054569 | A1 * | 3/2004 | Pombo et al. | 705/7 |
| 2004/0088347 | A1 * | 5/2004 | Yeager et al. | 709/202 |
| 2004/0088348 | A1 * | 5/2004 | Yeager et al. | 709/202 |
| 2004/0088369 | A1 * | 5/2004 | Yeager et al. | 709/217 |
| 2004/0093323 | A1 * | 5/2004 | Bluhm et al. | 707/3 |

(Continued)

OTHER PUBLICATIONS

Office Action (Mail Date May 8, 2009) for U.S. Appl. No. 11/625,358, filed Jan. 22, 2007; Confirmation No. 8344.

(Continued)

*Primary Examiner* — Rupal Dharia
*Assistant Examiner* — Marcus McKenzie
(74) *Attorney, Agent, or Firm* — Schmeiser, Olsen & Watts

(57) ABSTRACT

A communication method and system. The method includes receiving, by a computing system, user identification data identifying a first user. The computing system receives first device identification data identifying a first device belonging to the user and second device identification data identifying a second device belonging to the first user. The computing system associates the first device identification data and the second device identification data with the first user identification data. The computing system transmits connection data and the second device identification data to the first device. The computing system receives first informational data for the user. The computing system transmits to the first device and the second device, copies of the first informational data.

20 Claims, 3 Drawing Sheets

(56) References Cited

U.S. PATENT DOCUMENTS

| | | |
|---|---|---|
| 2004/0133640 A1* | 7/2004 | Yeager et al. ................. 709/204 |
| 2005/0021777 A1* | 1/2005 | Nakao et al. .................. 709/228 |
| 2005/0289265 A1* | 12/2005 | Illowsky et al. ............. 710/104 |
| 2005/0289266 A1* | 12/2005 | Illowsky et al. ............. 710/104 |
| 2006/0008256 A1* | 1/2006 | Khedouri et al. ............. 386/124 |
| 2006/0184566 A1* | 8/2006 | Lo et al. ........................ 707/102 |
| 2007/0027921 A1* | 2/2007 | Alvarado et al. .......... 707/104.1 |
| 2007/0150608 A1* | 6/2007 | Randall et al. ................ 709/228 |
| 2007/0174246 A1* | 7/2007 | Sigurdsson et al. .............. 707/3 |
| 2007/0180268 A1* | 8/2007 | Filimon et al. ................ 713/192 |
| 2007/0245223 A1* | 10/2007 | Siedzik et al. ............. 715/500.1 |
| 2008/0123852 A1* | 5/2008 | Jiang ............................. 380/273 |
| 2008/0176540 A1* | 7/2008 | Khedouri et al. .......... 455/414.1 |
| 2008/0177860 A1* | 7/2008 | Khedouri et al. ............. 709/217 |
| 2008/0201321 A1* | 8/2008 | Fitzpatrick et al. ............... 707/5 |
| 2009/0151006 A1* | 6/2009 | Saeki et al. ..................... 726/28 |
| 2011/0154255 A1* | 6/2011 | Ryu et al. ...................... 715/810 |
| 2012/0095962 A1* | 4/2012 | Goldman et al. ............. 707/634 |

OTHER PUBLICATIONS

Office Action (Mail Date Sep. 15, 2009) for U.S. Appl. No. 11/625,358, filed Jan. 22, 2007; Confirmation No. 8344.

* cited by examiner

MULTI-DEVICE COMMUNICATION METHOD AND SYSTEM

This application is a continuation of application claiming priority to Ser. No. 11/625,358, filed Jan. 22, 2007.

FIELD OF THE INVENTION

The present invention relates to a method and associated system for controlling communications between a plurality of user devices.

BACKGROUND OF THE INVENTION

Transmitting data within a network typically comprises an inefficient process with little flexibility. Accordingly, there exists a need in the art to overcome the deficiencies and limitations described herein above.

SUMMARY OF THE INVENTION

The present invention provides a communication method comprising:

receiving, by a computing system, first user identification data identifying a first user, said computing system comprising a memory device;

storing, said first user identification data in said memory device;

receiving, by said computing system, first device identification data identifying a first device belonging to said first user;

storing said first device identification data in said memory device;

associating, by said computing system, said first device identification data with said first user identification data;

accepting, by said computing system, a first connection between said first device and said computing system;

receiving, by said computing system, second device identification data identifying a second device belonging to said first user;

storing said second device identification data in said memory device;

associating, by said computing system, said second device identification data with said first user identification data;

accepting, by said computing system, a second connection between said second device and said computing system;

transmitting, by said computing system to said first device, said second device identification data;

transmitting, by said computing system to said first device, connection data associated with said second connection;

receiving, by said computing system, first informational data for said first user;

storing, said first informational data in said memory device; and transmitting, by said computing system to said first device and said second device, copies of said first informational data.

The present invention provides a computing system comprising a processor coupled to a computer-readable memory unit, said memory unit comprising instructions that when executed by the processor implement a communication method, said method comprising:

receiving, by a computing system, first user identification data identifying a first user, storing said first user identification data in said memory unit;

receiving, by said computing system, first device identification data identifying a first device belonging to said first user;

storing said first device identification data in said memory unit;

associating, by said computing system, said first device identification data with said first user identification data;

accepting, by said computing system, a first connection between said first device and said computing system;

receiving, by said computing system, second device identification data identifying a second device belonging to said first user;

storing said second device identification data in said memory unit;

associating, by said computing system, said second device identification data with said first user identification data;

accepting, by said computing system, a second connection between said second device and said computing system;

transmitting, by said computing system to said first device, said second device identification data;

transmitting, by said computing system to said first device, connection data associated with said second connection;

receiving, by said computing system, first informational data for said first user;

storing, said first informational data in said memory unit; and transmitting, by said computing system to said first device and said second device, copies of said first informational data.

The present invention provides a computer program product, comprising a computer usable medium comprising a computer readable program code embodied therein, said computer readable program code adapted to implement a communication method within a computing system, said method comprising:

receiving, by a computing system, first user identification data identifying a first user, storing said first user identification data in said computer usable medium;

receiving, by said computing system, first device identification data identifying a first device belonging to said first user;

storing said first device identification data in said computer usable medium;

associating, by said computing system, said first device identification data with said first user identification data;

accepting, by said computing system, a first connection between said first device and said computing system;

receiving, by said computing system, second device identification data identifying a second device belonging to said first user;

storing, said second device identification data in said computer usable medium;

associating, by said computing system, said second device identification data with said first user identification data;

accepting, by said computing system, a second connection between said second device and said computing system;

transmitting, by said computing system to said first device, said second device identification data;

transmitting, by said computing system to said first device, connection data associated with said second connection;

receiving, by said computing system, first informational data for said first user;

storing, said first informational data in said computer usable medium; and transmitting, by said computing system to said first device and said second device, copies of said first informational data.

The present invention advantageously provides a method and associated system capable of transmitting data within a network.

DETAILED DESCRIPTION OF THE INVENTION

Figure 1:
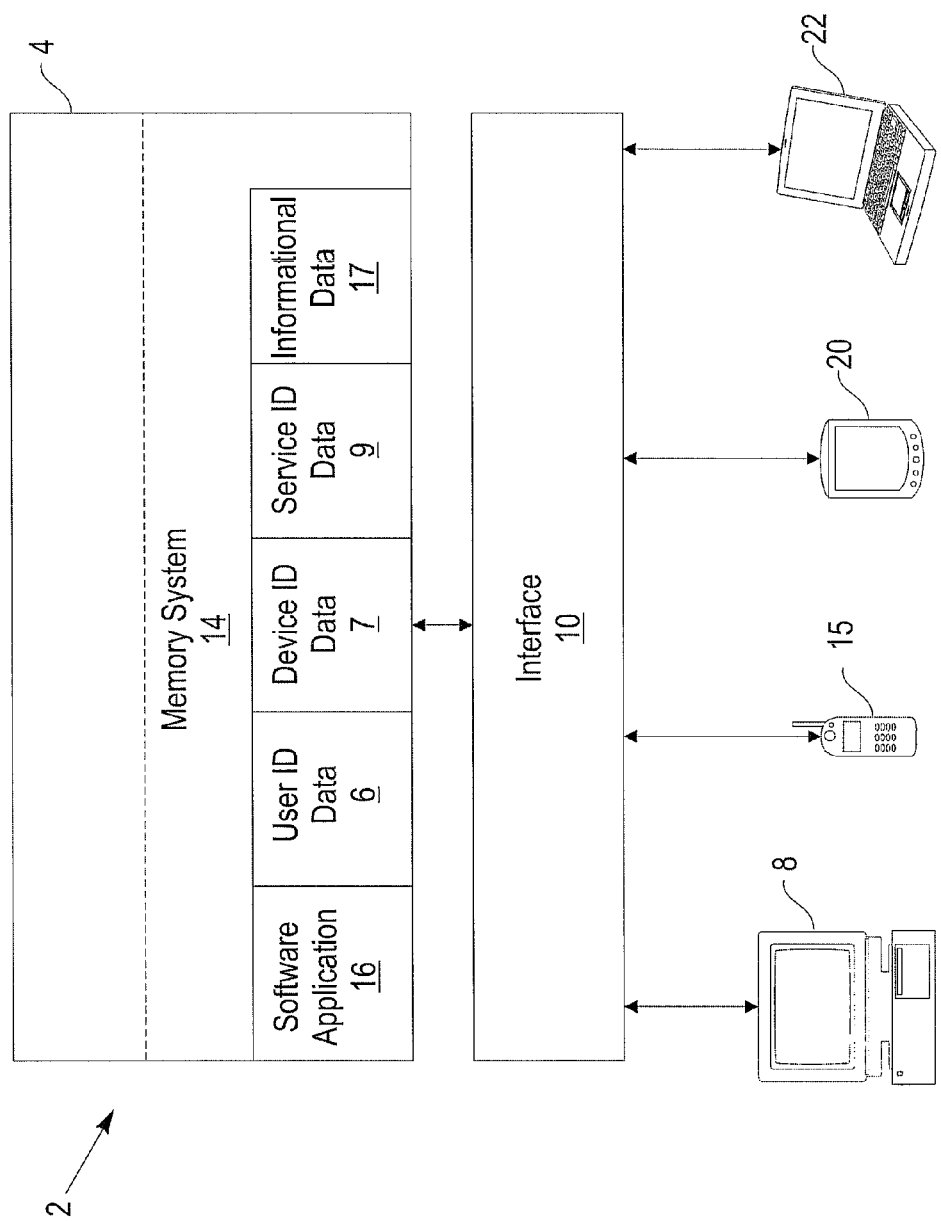
FIG. 1 illustrates a block diagram of a system for managing communications through a plurality of devices, in accordance with embodiments of the present invention.

FIG. 1 illustrates a block diagram of a system 2 for managing communications through a plurality of devices, in accordance with embodiments of the present invention. System 2 allows a user to manage a collection of communication devices (e.g., devices 8, 15, 20, and 22) using a single user identification (e.g., a user ID) associated with each device. System 2 may be used to allow the user perform the following functions:

1. Each device identity is associated to or disassociated from a user identity (e.g., a user name) in order to perform the following functions:
   A. A user may add/remove devices associated with their user identity (i.e., user ID).
   B. Computing system 4 may automatically transmit changes in the set of associated devices to all of the user's devices.
   C. Computing system 4 may automatically transmit changes in device availability to all of the user's devices.
   D. Messages may be transmitted to/from a user ID/device ID pair.
   E. Messages may be transmitted to all of the user's devices or all of the user's available (i.e., enabled) devices.
2. Update or cancel messages queued on computing system 4 pending delivery.
3. Save user-specific data on computing system 4.
4. Allow a message extension to cause a message sent to other devices to automatically update data stored on computing system 4.
5. Set sharing permissions in order to share data with other users.

System 2 comprises a computing system 4 (e.g., a server) connected to a plurality of communication devices 8, 15, 20, and 22 through an interface 10. Interface 10 may comprise any type of interface known to a person of ordinary skill in the art including, inter alia, a local area network, (LAN), a wide area network (WAN), the Internet, etc. Communication devices 8, 15, 20, and 22 may comprise any type of communication devices known to a person of ordinary skill in the art. For example, in FIG. 1 communication device 8 is a personal computer (PC), communication device 15 is a cellular telephone, communication device 20 is a personal digital assistant (PDA), and communication device 22 is a laptop computer. Computing system 4 comprises a memory device 14. Alternatively, memory device 14 may be located external to computing system 4. Memory device 14 comprises a software application 16, user ID data 6, device ID data 7, service ID data 9, and informational data 17. User ID data 6, device ID data 7, service ID data 9, and informational data 17 may be inputted into computing system 4 using any of communication devices 8, 15, 20, and 22. Device ID data 7 and service ID data 9 are associated with or disassociated from user ID data 6. Each user has an ID (i.e., an alpha/numeric identifier from user ID data 6) that is affiliated with that particular user. Each of communication devices 8, 15, 20, and 22 comprises an ID (i.e., an alpha/numeric identifier from device ID data 7) that is simultaneously unique but affiliated with a particular user (e.g. John Doe/Home Desktop, Joe Doe/Work Laptop, etc).

System 2 provides three core capabilities:

1. System 2 maintains a set of communication devices 8, 15, 20, and 22 for a user (i.e., the user's personal devices). Software application 16 enables users to indicate changes to their set of communication devices. Additionally, each communication device is able to access information related to the changes. Software application 16 provides availability information for each of communication devices 8, 15, 20, and 22. Additionally, software application 16 supports sending messages to an explicitly specified subset of a user's devices, all of a user's devices, or all of the user's available devices.

2. System 2 comprises the ability to delay delivery of messages (i.e., informational data 17) to offline (i.e., disabled) communication devices and also supports replacement or cancellation of delayed messages. System 2 uses a message identifier to indicate which message should be replaced or cancelled.

3. System 2 provides user specific storage that allows services to cache information on computing system 4 for the user's communication devices to access at any point in the future. For example, a service that allows users to keep track of recent email contacts across communication devices could cache contact information on computing system 4 so that other communication devices may access the information. This capability supports sharing a large body of information that could be too big to be exchanged through a single message. System 2 allows services to directly cache information either all at once or incrementally. Additionally, services can add an extension to messages exchanged with other communication devices to cause computing system 4 to indirectly update the cache by incorporating some or all of the exchanged information.

Each of communication devices 8, 15, 20, and 22 comprises a software application (i.e., a client) that runs on each of communication devices 8, 15, 20, and 22 and communicates with computing system 4. Each client (i.e., on each of communication devices 8, 15, 20, and 22) is responsible for connecting to and managing communications with computing system 4, and it provides an abstraction layer that services running on that device can use to exchange information with other devices. Each client:

1. Receives messages that services want to send to other communication devices.
2. Routes those messages to computing system 4.
3. Receives new messages from computing system 4 for that particular device.
4. Determines which service or services should receive those messages.
5. Routes the messages to those services.

Additionally, each client notifies services of changes in availability for the user's other devices and for any other specified devices that a service expresses interest in. As part of managing communication with computing system 4 and other devices, the client also notifies services when communication should be suspended due to a lost connection with the computing system 4 and resumed because of a re-established connection.

The client supports two types of connections with services.
1. The client may directly initiate services itself and communicate with the services via a service object.
2. The client may detect socket connections from services that will be run independently from the client but still exchange messages with computing system 4 or other communication devices. A client may handle simultaneous communication with multiple services.

The following list illustrates examples of services:

1. A notebooks service that allows a user to keep a set of shared notebooks across personal communication devices.
2. A shared lists service that allows a user to keep a set of lists across personal communication devices and optionally share lists with other users.
3. A "recent shortcuts" service that allows a user to access recent contact information, recently received attachments, and recently used files across any personal communication devices.
4. A multi-device search service that allows a user to initiate a search across personal communication devices from any of those device.
5. A send-a-file service that allows a user to send a file from one personal communication device to any other personal communication device(s).
6. A file synchronization service that allows a user to keep groups of files and/or directories synchronized across multiple personal communication devices.

The following description illustrates the above six examples for using system 2 for implementing services:

Example 1

Example 1 illustrates a notebooks service. When a client enables the service, the service requests any current notebooks and their contents for a shared notebooks service ID (i.e., from service ID data 9) from computing system 4 via the client on one of communication devices 8, 15, 20, or 22. When the service receives the stored list of notebook names and contents (via the client), it creates a simple graphical user interface (GUI) that displays the list of notebooks. A users may add, delete, or rename notebooks and each action (i.e., add, delete, rename, etc) results in a message transmitted to all available devices (i.e., communication devices that are enabled) for the user detailing the change. The message contains an extension that causes computing system 4 to store changed data (i.e., informational data 17). Users may also edit/add to the notebook contents and each change to a notebook's contents results in a message to all available devices with the new contents. The message contains an extension causing computing system 4 to store the updated contents.

Example 2

Example 2 illustrates a shared lists service that provides a user with access to lists of items, which include both a description and a complete/incomplete status, across personal devices and additionally supports sharing with other users. Specifically, a user may choose to share their lists with other users (including allowing other users to edit those lists). When a client enables the service, the service requests any stored data for a shared lists service ID. In addition to adding, renaming, or deleting lists, users may additionally change the user IDs that the list is shared with. When a user makes a change to a list (including its contents), the service sends an update message to all available (i.e., enabled) communication devices for all of the user IDs that the list is shared with. The message contains an extension causing computing system 4 to store the updated contents.

Example 3

Example 3 illustrates a "recent shortcuts" service. This service requests a list of recent contact information, recent attachments, and recently used files from a recent shortcuts service ID on computing system 4 on start-up and displays the results in a GUI. Whenever a user reads or writes a new email message or engages in an instant messaging chat session, the service generates new recent contact information and sends it all of the user's available personal communication devices in a message that includes an extension that causes computing system 4 to update stored data. The same pattern holds for recent attachments (updated and sent to available personal communication devices whenever the user read an email with an attachment) and recent files (updated and sent to available personal communication devices whenever a device's operating system reports a new recently used file). Whenever the user double-clicks on a listed recently used file or received attachment that is not stored on the current communication device, the service sends a message to the originating device requesting that file.

Example 4

Example 4 illustrates a multi-device search service. This service presents a simple GUI to the user, who enters any desired search terms. The service then sends a message to all of the user's available personal communication devices with those terms. Each receiving communication device performs a local search for candidate matches and returns that list of candidates to the requesting device. That device presents all the results as a list to the user. The user may double-click on a file in the list to cause the service to send a message to the owning communication device requesting that file.

Example 5

Example 5 illustrates a file sending service. This service allows the user to choose a file on the local communication device and one or more of personal communication devices to send it to. Issuing this command will transmit the file to all of the specified devices.

Example 6

Example 6 illustrates a file synchronization service. This service allows users to specify groups of files and/or directories that they want to keep synchronized across one or more of their personal communication devices. The services on the involved devices exchange information about changes to files in the different synchronization groups and when a file is updated on one device the service sends it to the other devices in the group tracking that file.

Figure 2:
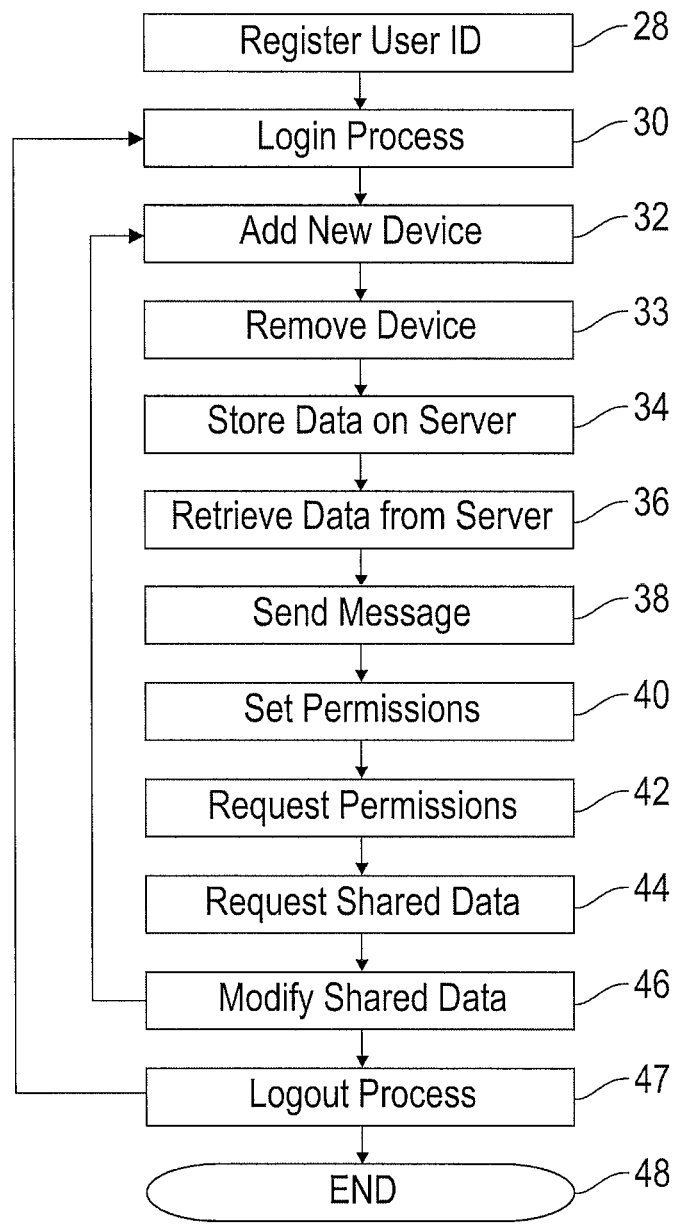
FIG. 2 illustrates a flowchart describing an algorithm used by the system of FIG. 1 for managing communications through a plurality of devices, in accordance with embodiments of the present invention.

FIG. 2 illustrates a flowchart describing an algorithm used by system 2 of FIG. 1 for managing communications through a plurality of devices, in accordance with embodiments of the present invention. Each step in the algorithm of FIG. 2 comprises an optional step that may or may not be executed. In step 28, a user creates a user ID and a password. The user ID and password is registered with computing apparatus 4 of FIG. 1. In step 30, the user logs in to system 2 of FIG. 1 to perform the following process:

1. A client (i.e., a software application on a first communication device) transmits the user ID, password, and device ID (i.e., for the first communication device) to computing system 4.
2. If the user ID and password are valid, computing system 4 performs the following functions:
   A. Sets the status for the device ID owned by the user ID to an available status.

B. Returns a message to device ID with a roster: a list of user ID's devices and the status (i.e., available or unavailable) for each.
C. Transmits a message to each of user ID's other devices indicating that device ID is available.
D. Checks for any messages queued up on computing system 4 that are addressed to user ID/device ID. Computing system 4 transmits any available queued messages.

3. The client on device ID transmits the roster to each of its connected services.
4. The clients on each of the other receiving devices transmit the availability of device ID to each of their connected services.

In step 32, a new communication device is added to system 2. The following procedure illustrates the new device addition process:
1. A client (e.g., for the new device) transmits a message from user ID/device ID with a new device ID' (where device ID' may be device ID) to computing system 4.
2. Computing system 4 adds the new device ID' to the list of user ID's devices and sets its status to available (if device ID' is device ID) or unavailable (if it is not).
3. Computing system 4 transmits the new roster (list of devices and the status of each) to each of user ID's available devices.
4. Each client on a receiving device transmits the new roster to each of their connected services.

In step 33, an existing communication device may be removed from system 2.
The following procedure illustrates steps in an existing communication device removal process:
1. A client (e.g., for the device to be removed) sends a message from user ID/device ID with the device ID' (where device ID' may be device ID) to remove from computing system 4.
2. Computing system 4 removes device ID' from a list of user ID's devices.
3. Computing system 4 transmits a new roster (list of devices and the status of each) to each of user ID's available devices.
4. Each client on each receiving device sends the roster to each of their connected services.

In step 34, a service stores data within computing system 4. The following procedure illustrates steps in a data storage process:
1. A service transmits a service ID, data ID, and data to a client.
2. The client transmits a message from user ID/device ID with that information to computing system 4.
3. Computing system 4 stores the data in a location indexed by user ID/service ID/data ID.
4. Computing system 4 returns an acknowledgement to the client.
5. The client sends the acknowledgement to the service.

In step 36, a service retrieves data from computing system 4. The following procedure illustrates steps in a data retrieval process:
1. A service transmits a service ID and a data ID to a client.
2. The client transmits a message from user ID/device ID with that information to computing system 4.
3. Computing system 4 transmits the data stored at the location indexed by user ID/service ID/data ID to the client.
4. The client sends the data to the service.

In step 38, a service transmits a message. The following procedure illustrates steps in a message transmission process:
1. A service transmits an address, service ID, and data to a client.
2. The client transmits a message from user ID/device ID with that information to computing system 4.
3. Computing system 4 performs an action dependent upon on the address:
   3a. If the address is user ID'/All Devices (where user ID' may be user ID), computing system 4 forwards the message to all of the devices associated with user ID's (optionally excepting device ID if user ID' is user ID). Computing system 4 queues up the message for later delivery for devices that are not currently available.
   3b. If the address is user ID'/All Available Devices (where user ID' may be user ID), computing system 4 forwards the message to all of the available devices associated with user ID' (optionally excepting device ID if user ID' is user ID).
   3c. For any other user ID'/device ID' combination (where user ID' may be user ID), computing system 4 forwards the message to the device ID' associated with user ID'.
4. Each client on a receiving device checks the service ID and sends the message to each service registered to receive messages with that service ID.

A first extension process to the procedure of step 38 for indirectly updating stored data on computing system 4 is described as follows:
1. In addition to sending the address, serviceID, and data to the client, the service also sends a data ID.
2. In addition to forwarding the message as appropriate for the supplied address, computing system 4 also stores the data tagged with the data ID (which may be some or all of the data) in the location indexed by user ID/service ID/data ID.

A second extension process to the procedure of step 38 for replacing or canceling a queued message is described as follows:
1. In addition to sending the address, service ID, and data to the client, the service also sends a message ID to the client.
2. As before, but including the message ID.
3. As before, but when queuing up the message for delivery to an unavailable device, the server checks for an existing queued message that also has message ID; if it finds one, it either:
(a) replaces the queued message (if the new message includes data).
or
(b) cancels it (and the new message) if the new message's data field is empty.

In step 40, permissions are set for sharing data. The following procedure illustrates steps in a setting permissions process:
1. A service sends a service ID, data ID, some user IDs, a request type, and permissions to the client.
2. The client sends a message from user ID/device ID with that information to the server.
3. If the request type is:
   3a. An add request: Computing system 4 adds the specified permissions (e.g., 'read' and/or 'write') to all of the specified user IDs.
   3b. A remove request: Computing system 4 removes the specified permissions (e.g., 'read' and/or 'write') from all of the specified user IDs.
   3c. A set request: Computing system 4 sets the specified permissions (e.g., 'read' and/or 'write') for all of the specified user IDs.

In each of cases 3*a* . . . 3*c*, the permissions are set for the data indexed by user ID/service ID/data ID. If data ID is empty (not specified), the permissions apply to all of the data indexed by user ID/service ID (i.e., allowing data sharing at the service ID level).

4. Computing system 4 returns an acknowledgement to the client.
5. The client forwards the acknowledgement to the service.

In step 42, a service requests the permissions for shared data. The following procedure illustrates steps in a requesting permissions process:
1. The service transmits a service ID and data ID to the client.
2. The client transmits a message from user ID/device ID with that information to computing system 4.
3. Computing system 4 transmits the sharing permissions for data indexed by user ID/service ID/data ID to the client. If a data ID is not specified, computing system 4 transmits the permissions indexed by user ID/service ID.
4. The client transmits the data to the service.

In step 44, a service requests shared data stored by another user. The following procedure illustrates steps in a requesting shared stored data process:
1. The service transmits a user ID', service ID, and data ID to the client.
2. The client transmits a message from user ID/device ID with that information to computing system 4.
3. Computing system 4 checks the sharing permissions for data indexed by user ID'/service ID/data ID. If user ID has permission to read that data, it sends the data to the client.
4. The client transmits the data to the service.

In step 46, shared stored data is modified by another user. The following procedure illustrates steps in a modifying shared stored data process:
1. A service transmits a user ID', service ID, data ID, and data to the client.
2. The client sends a message from user ID/device ID with that information to computing system 4.
3. Computing system 4 checks the sharing permissions for the location indexed by user ID'/service ID/data ID. If user ID has permission to write to that location, computing system 4 stores the data.
4. Computing system 4 returns an acknowledgement to the client.
5. The client sends the acknowledgement to the service.

Any of steps 32-46 may be repeated as many times as necessary.

In step 47, the user may log out of computing system 4. The log out process performs the following procedure:
1. The client (i.e., the software application on the first communication device) transmits a logout message from user ID/device ID to computing system 4.
2. Computing system 4 transmits a message to each of user ID's other available devices notifying them that device ID is now unavailable.
3. Each client on a receiving device transmits the unavailability of device ID to each of their connected services.

After the user logs out in step 47, he/she may either repeat step 30 in order to log back in or the process terminates in step 48.

Figure 3:
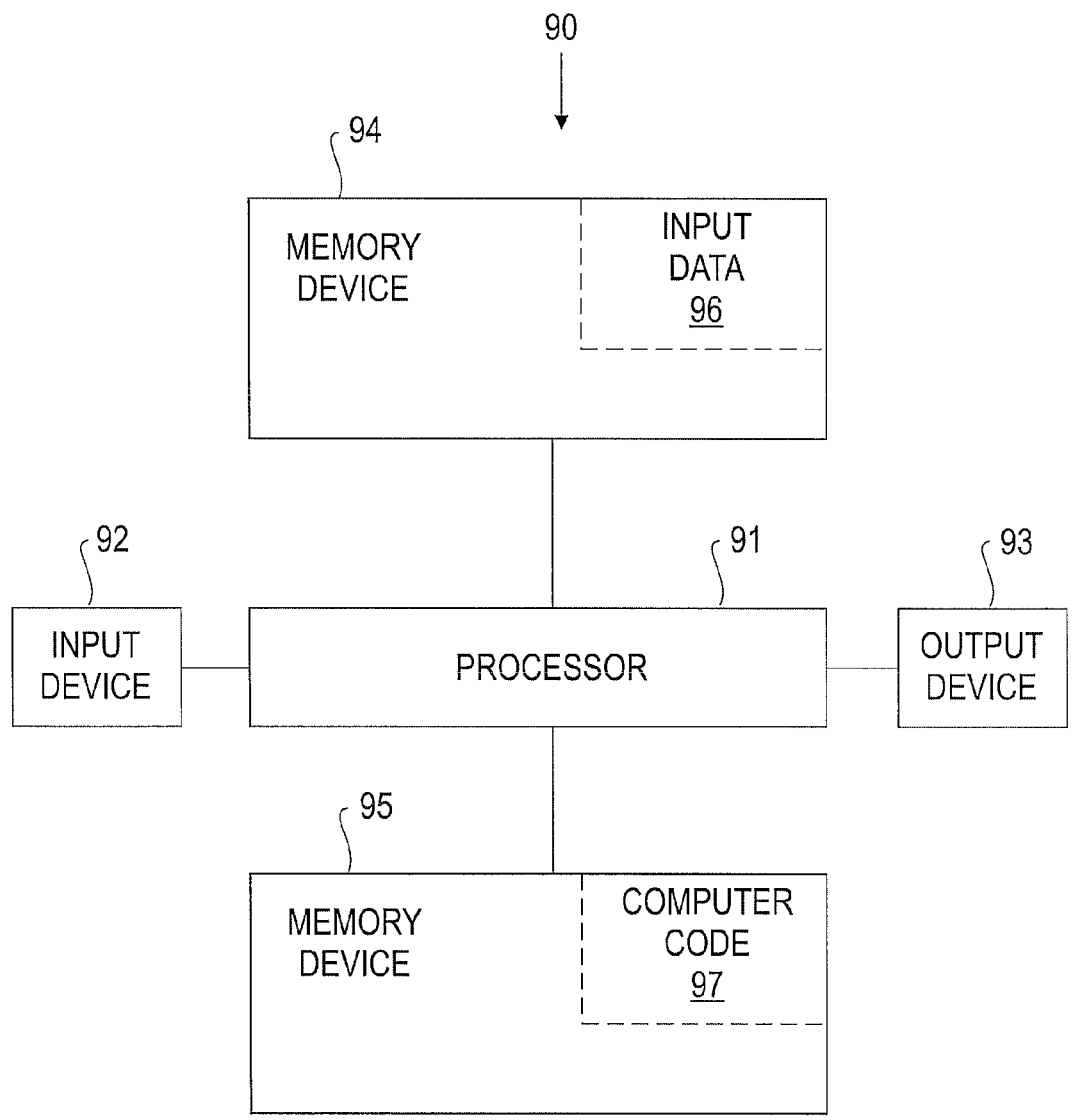
FIG. 3 illustrates a computer apparatus used for managing communications through a plurality of devices, in accordance with embodiments of the present invention.

FIG. 3 illustrates a computer apparatus 90 (i.e., within computing system 4 in FIG. 1) used for managing communications through a plurality of devices, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithm of FIG. 2) for managing communications through a plurality of devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to manage communications through a plurality of devices. Thus the present invention discloses a process for deploying or integrating computing infrastructure, comprising integrating computer-readable code into the computer system 90, wherein the code in combination with the computer system 90 is capable of performing a method for managing communications through a plurality of devices. In another embodiment, the invention provides a business method that performs the process steps of the invention on a subscription, advertising, and/or fee basis. That is, a service provider, such as a Solution Integrator, could offer to manage communications through a plurality of devices. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A communication method comprising:
receiving, by a computing system, first user identification data identifying a first user, said computing system comprising a memory device;
storing, said first user identification data in said memory device;
receiving, by said computing system, first device identification data identifying a first device belonging to said first user;
storing said first device identification data in said memory device;

associating, by said computing system, said first device identification data with said first user identification data;

accepting, by said computing system, a first connection between said first device and said computing system;

receiving, by said computing system, second device identification data identifying a second device belonging to said first user;

storing said second device identification data in said memory device;

associating, by a computer processor of said computing system, said second device identification data with said first user identification data;

accepting, by said computing system, a second connection between said second device and said computing system;

transmitting, by said computing system to said first device in response to said second connection, said second device identification data;

transmitting, by said computing system to said first device, connection data associated with said second connection;

receiving, by said computing system, first informational data for said first user;

storing, said first informational data in said memory device, wherein said first informational data is queued on said computing system, and wherein said first informational data comprises an extension for performing functions associated with data;

setting, by said computing system in response to a first command from said user, sharing permissions associated with said first informational data, wherein said sharing permissions indicate that said first informational data may be transmitted to additional users;

transmitting, by said computing system to said first device and said second device, copies of said first informational data;

receiving, by said computing system from said first user, a search command for locating specified data located in said first device, said second device, or a third device belonging to said first user;

accessing, by said computing system in response to said search command, said first device, said second device, and said third device in order to locate said specified data;

locating, by said computing system, said specified data on said first device;

retrieving, by said computing system, said specified data from said first device;

transmitting, by said computing system to said second device and said third device, said specified data retrieved from said first device;

after said transmitting said specified data, canceling by said computing system, said first informational data queued on said computing system;

updating, by said computing system based on said extension, said specified data stored in a cache of said computing system;

enabling, by said computing system, a notebooks service enabling said first user to keep a set of shared notebooks across said first device, said second device, and said third device, wherein said enabling said notebooks service comprises generating a graphical user interface (GUI) displaying a list presenting said set of shared notebooks so that said first user may add, delete, and rename said shared notebooks resulting in messages detailing any changes being automatically transmitted to said first device, said second device, and said third device, and wherein said messages comprise first extensions causing said computing system to automatically store said changed data;

enabling, by said computing system, a shared lists service enabling said first user to maintain a set of lists across said first device, said second device, and said third device such that when said first user makes a change to content of a list of said set of lists, said shared lists service automatically transmits update messages to said first device, said second device, and said third device, and wherein said update messages comprise second extensions causing said computing system to automatically store updated contents resulting from said change to content; and enabling, by said computing system, a file synchronization service enabling said first user to specify synchronization groups of files and/or directories to be automatically synchronized across said first device, said second device, and said third device, wherein said file synchronization service automatically exchanges, between said first device, said second device, and said third device, information associated with changes to files within said synchronization groups.

2. The method of claim 1, further comprising:
disassociating, by said computing system, said second device identification data from said first user identification data.

3. The method of claim 1, further comprising:
receiving, by said computing system, second informational data for said first user;
removing, by said computing system, said first informational data from said memory device; and
storing, said second informational data in said memory device after said removing said first informational data.

4. The method of claim 1, further comprising:
authorizing, by said computing system, additional devices associated with additional users to access said first informational data.

5. The method of claim 1, further comprising:
receiving, by said computing system, third device identification data identifying a third device belonging to said first user;
storing said third device identification data in said memory device;
associating, by said computing system, said third device identification data with said first user identification data;
accepting, by said computing system, a third connection between said third device and said computing system;
transmitting, by said computing system to said first device and said second device, said third device identification data; and
transmitting, by said computing system to said first device and said second device, connection data associated with said third connection.

6. The method of claim 5, further comprising:
transmitting, by said computing system to said third device, an additional copy of said first informational data.

7. The method of claim 1, further comprising:
receiving, by said computing system from said first user, a search command for locating specified data; and
accessing, by said computing system in response to said search command, said first device and said second device in order to locate said specified data.

8. A computing system comprising a computer processor coupled to a computer-readable memory unit, said memory unit comprising instructions that when executed by the computer processor implement a communication method, said method comprising:

receiving, by a computing system, first user identification data identifying a first user;

storing said first user identification data in said memory unit;

receiving, by said computing system, first device identification data identifying a first device belonging to said first user;

storing said first device identification data in said memory unit;

associating, by said computing system, said first device identification data with said first user identification data;

accepting, by said computing system, a first connection between said first device and said computing system;

receiving, by said computing system, second device identification data identifying a second device belonging to said first user;

storing said second device identification data in said memory unit;

associating, by said computer processor, said second device identification data with said first user identification data;

accepting, by said computing system, a second connection between said second device and said computing system;

transmitting, by said computing system to said first device in response to said second connection, said second device identification data;

transmitting, by said computing system to said first device, connection data associated with said second connection;

receiving, by said computing system, first informational data for said first user;

storing, said first informational data in said memory unit, wherein said first informational data is queued on said computing system, and wherein said first informational data comprises an extension for performing functions associated with data;

setting, by said computing system in response to a first command from said user, sharing permissions associated with said first informational data, wherein said sharing permissions indicate that said first informational data may be transmitted to additional users;

transmitting, by said computing system to said first device and said second device, copies of said first informational data;

receiving, by said computing system from said first user, a search command for locating specified data located in said first device, said second device, or a third device belonging to said first user;

accessing, by said computing system in response to said search command, said first device, said second device, and said third device in order to locate said specified data;

locating, by said computing system, said specified data on said first device;

retrieving, by said computing system, said specified data from said first device;

transmitting, by said computing system to said second device and said third device, said specified data retrieved from said first device;

after said transmitting said specified data, canceling by said computing system, said first informational data queued on said computing system;

updating, by said computing system based on said extension, said specified data stored in a cache of said computing system;

enabling, by said computing system, a notebooks service enabling said first user to keep a set of shared notebooks across said first device, said second device, and said third device, wherein said enabling said notebooks service comprises generating a graphical user interface (GUI) displaying a list presenting said set of shared notebooks so that said first user may add, delete, and rename said shared notebooks resulting in messages detailing any changes being automatically transmitted to said first device, said second device, and said third device, and wherein said messages comprise first extensions causing said computing system to automatically store said changed data;

enabling, by said computing system, a shared lists service enabling said first user to maintain a set of lists across said first device, said second device, and said third device such that when said first user makes a change to content of a list of said set of lists, said shared lists service automatically transmits update messages to said first device, said second device, and said third device, and wherein said update messages comprise second extensions causing said computing system to automatically store updated contents resulting from said change to content; and enabling, by said computing system, a file synchronization service enabling said first user to specify synchronization groups of files and/or directories to be automatically synchronized across said first device, said second device, and said third device, wherein said file synchronization service automatically exchanges, between said first device, said second device, and said third device, information associated with changes to files within said synchronization groups.

9. The computing system of claim 8, wherein said method further comprises:

disassociating, by said computing system, said second device identification data from said first user identification data.

10. The computing system of claim 8, wherein said method further comprises:

receiving, by said computing system, second informational data for said first user;

removing, by said computing system, said first informational data from said memory unit; and storing, said second informational data in said memory unit after said removing said first informational data.

11. The computing system of claim 8, wherein said method further comprises:

authorizing, by said computing system, additional devices associated with additional users to access said first informational data.

12. The computing system of claim 8, wherein said method further comprises:

receiving, by said computing system, third device identification data identifying a third device belonging to said first user;

storing said third device identification data in said memory unit;

associating, by said computing system, said third device identification data with said first user identification data;

accepting, by said computing system, a third connection between said third device and said computing system;

transmitting, by said computing system to said first device and said second device, said third device identification data; and transmitting, by said computing system to said first device and said second device, connection data associated with said third connection.

13. The computing system of claim 12, wherein said method further comprises:
   transmitting, by said computing system to said third device, an additional copy of said first informational data.

14. The computing system of claim 8, wherein said method further comprises:
   receiving, by said computing system from said first user, a search command for locating specified data; and
   accessing, by said computing system in response to said search command, said first device and said second device in order to locate said specified data.

15. A computer program product, comprising a computer readable storage hardware storage device storing a computer readable program code, said computer readable program code adapted to implement a communication method within a computing system comprising a computer processor, said method comprising:
   receiving, by a computing system, first user identification data identifying a first user;
   storing said first user identification data in said computer usable medium;
   receiving, by said computing system, first device identification data identifying a first device belonging to said first user;
   storing said first device identification data in said computer usable medium;
   associating, by said computing system, said first device identification data with said first user identification data;
   accepting, by said computing system, a first connection between said first device and said computing system;
   receiving, by said computing system, second device identification data identifying a second device belonging to said first user;
   storing, said second device identification data in said computer usable medium;
   associating, by said computer processor, said second device identification data with said first user identification data;
   accepting, by said computing system, a second connection between said second device and said computing system;
   transmitting, by said computing system to said first device in response to said second connection, said second device identification data;
   transmitting, by said computing system to said first device, connection data associated with said second connection;
   receiving, by said computing system, first informational data for said first user;
   storing, said first informational data in said computer readable storage medium, wherein said first informational data is queued on said computing system, and wherein said first informational data comprises an extension for performing functions associated with data;
   setting, by said computing system in response to a first command from said user, sharing permissions associated with said first informational data, wherein said sharing permissions indicate that said first informational data may be transmitted to additional users;
   transmitting, by said computing system to said first device and said second device, copies of said first informational data;
   receiving, by said computing system from said first user, a search command for locating specified data located in said first device, said second device, or a third device belonging to said first user;
   accessing, by said computing system in response to said search command, said first device, said second device, and said third device in order to locate said specified data;
   locating, by said computing system, said specified data on said first device;
   retrieving, by said computing system, said specified data from said first device;
   transmitting, by said computing system to said second device and said third device, said specified data retrieved from said first device;
   after said transmitting said specified data, canceling by said computing system, said first informational data queued on said computing system;
   updating, by said computing system based on said extension, said specified data stored in a cache of said computing system;
   enabling, by said computing system, a notebooks service enabling said first user to keep a set of shared notebooks across said first device, said second device, and said third device, wherein said enabling said notebooks service comprises generating a graphical user interface (GUI) displaying a list presenting said set of shared notebooks so that said first user may add, delete, and rename said shared notebooks resulting in messages detailing any changes being automatically transmitted to said first device, said second device, and said third device, and wherein said messages comprise first extensions causing said computing system to automatically store said changed data;
   enabling, by said computing system, a shared lists service enabling said first user to maintain a set of lists across said first device, said second device, and said third device such that when said first user makes a change to content of a list of said set of lists, said shared lists service automatically transmits update messages to said first device, said second device, and said third device, and wherein said update messages comprise second extensions causing said computing system to automatically store updated contents resulting from said change to content; and
   enabling, by said computing system, a file synchronization service enabling said first user to specify synchronization groups of files and/or directories to be automatically synchronized across said first device, said second device, and said third device, wherein said file synchronization service automatically exchanges, between said first device, said second device, and said third device, information associated with changes to files within said synchronization groups.

16. The computer program product of claim 15, wherein said method further comprises:
   disassociating, by said computing system, said second device identification data from said first user identification data.

17. The computer program product of claim 15, wherein said method further comprises:
   receiving, by said computing system, second informational data for said first user;
   removing, by said computing system, said first informational data from said computer usable medium; and
   storing, said second informational data in said computer usable medium.

18. The method of claim 1, further comprising:
enabling, by said computing system, a service enabling an additional GUI automatically displaying results associated with recent contact information, recently received attachments, and recently used files shared across said first device, said second device, and said third device.

19. The method of claim 1, further comprising:
enabling, by said computing system, a multi-device search service enabling said first user to initiate a search across said first device, said second device, and said third device from any of said first device, said second device, and said third device, wherein said multi-device search service automatically transmits messages to said first device, said second device, and said third device, and wherein each of said first device, said second device, and said third device performs a local search for candidate matches and returns a list of candidates to a requesting device of said first device, said second device, and said third device.

20. The method of claim 1, further comprising:
enabling, by said computing system, a send-a-file service enabling said first user to send a file from one of said first device, said second device, and said third device to any other of said first device, said second device, and said third device.

* * * * *